US 7,058,598 B1

(12) United States Patent
Chen et al.

(10) Patent No.: US 7,058,598 B1
(45) Date of Patent: Jun. 6, 2006

(54) WEB PRICE OPTIMIZER OF MULTIPLE-ITEM PACKAGE ORDERS FOR E-COMMERCE ON THE INTERNET AND METHOD OF USE

(75) Inventors: Kai Chen, Hopewell Junction, NY (US); Xin Wang, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,930

(22) Filed: Apr. 30, 2000

(51) Int. Cl.
*G06F 17/60* (2006.01)

(52) U.S. Cl. .......................................... 705/26
(58) Field of Classification Search .................. 705/26, 705/27; 707/7
See application file for complete search history.

(56) References Cited

U.S. PATENT DOCUMENTS

| | | | | |
|---|---|---|---|---|
| 5,864,846 A | * | 1/1999 | Voorhees et al. | 707/5 |
| 5,901,287 A | | 5/1999 | Bull et al. | |
| 6,285,986 B1 | * | 9/2001 | Andrews | 705/26 |
| 2001/0051901 A1 | * | 12/2001 | Hager et al. | 705/26 |
| 2002/0004735 A1 | * | 1/2002 | Gross | 705/10 |

FOREIGN PATENT DOCUMENTS

WO WO-98/34187 A1 * 8/1998

OTHER PUBLICATIONS

See Continuation Sheets*
Web site: www.mysimon.com –apparently first published Dec. 3, 1998.
Web site: www.dealtime.com –apparently first published Nov. 11, 1998.
Web site: www.pricescan.com –apparently first published Dec. 12, 1997.
Web site: www.epinions.com –apparently first published Oct. 12, 1999.
Web site: www.bizrate.com –apparently first published Dec. 11, 1997.
Web site: shopping–search–engine.com —apparently first published Nov. 28, 1999.

* cited by examiner

*Primary Examiner*—Jeffrey A. Smith
(74) *Attorney, Agent, or Firm*—Otho B. Ross; Joseph P. Abate (57) ABSTRACT

Disclosed is an Internet-based method that enables users to search and browse for information (such as price) about a plurality of items (such as books) available for sale on the Internet, compare prices for the items individually or considered as a package, and optimize the package price. In a preferred embodiment, the invention searches for the lowest price and second lowest price for the desired items from Internet Web sites and databases, records the data in two matrices, and employs algorithms that implement certain set operations, including Cartesian product and set union, to optimize the result for all items.

28 Claims, 9 Drawing Sheets

[User input form at Website such as http://www.bestedeal.com]

Welcome to BESTeDEAL.com -- The BEST Comparison Shopping Agent for Books!
We bring the Best-E-Deals to you -- Books; Music; CDs; Videos.
Find the best book price from over 50 largest online bookstores in 20 seconds.

Enter any field to search, or enter multiple fields to narrow your search:

Book A Title:         <u>War and Peace</u>
Auhor's Last Name:    ______________________
Author's First Name:  ______________________
Keywords:             ______________________
Or search by ISBN:    ______________________

Book B Title:         <u>Moby Dick</u>
Auhor's Last Name:    ______________________
Author's First Name:  ______________________
Keywords:             ______________________
Or search by ISBN:    ______________________

Book C Title:         <u>The Twin Cities</u>
Auhor's Last Name:    ______________________
Author's First Name:  ______________________
Keywords:             ______________________
Or search by ISBN:    ______________________

Book D Title:         <u>TCP/IP</u>
Auhor's Last Name:    ______________________
Author's First Name:  ______________________
Keywords:             ______________________
Or search by ISBN:    ______________________

Book E Title:         ______________________
Auhor's Last Name:    ______________________
Author's First Name:  ______________________
Keywords:             ______________________
Or search by ISBN:    ______________________

<u>SEARCH</u>    <u>OPTIMIZE</u>

Book Stores | Contact Us | About Us | Cool Jobs | Help
Copyright 1998 - 2000 CollegeCity, Inc. All rights reserved.

FIG. 1

Optimization Result

| From Bookstore | Book Title | Number of Copies | Unit Price | Book Avail | S&H for all books if placing order | Tax for all books if placing order | Total Price | Buy Link |
|---|---|---|---|---|---|---|---|---|
| BN.com | War and Peace | 2 | $13 | In-stock | $5 UPS | $0 | $52 | Link to BN.com |
| | The Twin Cities | 1 | $21 | Out-of-stock | | | | |
| Amazon.com | Moby Dick | 5 | $12 | In-stock | $8 FedEx | $5 | $83 | Link to Amazon.com |
| | TCP/IP | 1 | $10 | Out-of-stock | | | | |

Notation:

S1a = Store with best price for item 1

FIG. 5

Notation:

S1a = Store with best price for item 1
S1b = Store with $2^{nd}$ best price for item 1
S2a = Store with best price for item 2
S2b = Store with $2^{nd}$ best price for item 2
X = Cartesian product
U = set union
(1, 1) = First store found that carries both items
M = Last store found that carries both items

FIG. 6

Notation:

S1a = Store with best price for item 1
S1b = Store with $2^{nd}$ best price for item 1
S2a = Store with best price for item 2
S2b = Store with $2^{nd}$ best price for item 2
S3a = Store with best price for item 3
S3b = Store with $2^{nd}$ best price for item 3
X = Cartesian product
U = set union
(1, 1) = First store found that carries all 3 items
M = Last store found that carries all 3 items

FIG. 7

Notation:

S1a = Store with best price for item 1
S1b = Store with $2^{nd}$ best price for item 1
S2a = Store with best price for item 2
S2b = Store with $2^{nd}$ best price for item 2
S3a = Store with best price for item 3
S3b = Store with $2^{nd}$ best price for item 3
S4a = Store with best price for item 4
S4b = Store with $2^{nd}$ best price for item 4
X = Cartesian product
∪ = set union
(1, 1) = First store found that carries all 4 items
M = Last store found that carries all 4 items

FIG. 8

Notation:

S1a = Store with best price for item 1
S1b = Store with 2$^{nd}$ best price for item 1
Sna = Store with best price for item n
Snb = Store with 2$^{nd}$ best price for item n
X = Cartesian product
U = set union
(1, 1) = First store found that carries all n items
M = Last store found that carries all n items

FIG. 9

WEB PRICE OPTIMIZER OF MULTIPLE-ITEM PACKAGE ORDERS FOR E-COMMERCE ON THE INTERNET AND METHOD OF USE

BACKGROUND OF THE INVENTION

1. Field of the Invention

This invention relates to electronic commerce, more specifically in the area of price or cost comparison and optimization of multiple-item package orders. In one embodiment, the invention relates to information processing and business methods for searching, optimized calculation, organization and display of information relating to items such as books via the Internet, to facilitate comparison browsing and shopping.

2. Prior Art

At present, some public and private search engines on the Internet permit a user to search for the lowest price or cost for one individual item, such as a book. However, there is a need for users to search for the prices of multiple items in a single session and optimize all the prices for all such items considered as a package, so that comparisons by price or another variable can easily be made. For example, a college student may be asked to purchase 3 or 4 textbooks at once for an upcoming semester in college. The student probably will be on a limited budget. Therefore, the student will be interested in finding out how all of the books can be purchased at the lowest total price. So far, this has been difficult if not impossible on the Internet.

In view of this unfilled need, it is an object of the present invention to provide a method for searching for the lowest price or cost information for multiple-item package orders on the Internet; calculating one or more optimized prices for the items both individually and grouped by online store; organizing and displaying such information in a format useful for easy price comparison and browsing; and providing a method for easily purchasing the optimized items.

SUMMARY OF THE INVENTION

To achieve the aforementioned objects, there is provided a method of searching for, calculating, organizing and displaying an optimized rank of information for multiple items on the Internet, the method comprising the steps of:

establishing an Internet Web site, the site operating as a computer interface for a user who wishes to search for information on at least one item;

receiving a search request from the user who uses communications equipment and software to access the Web site to obtain information about one or more of the items;

executing a computer search on the Internet for all of the items designated in the search request;

receiving information about the items from other Web sites or Internet databases;

calculating an optimized rank of all of the items considered as a package; and displaying the rank to the user.

In a preferred embodiment, the invention searches for the lowest price and second lowest price data for a plurality of items, designated by users, which items are being offered for sale by Internet Web sites; records the data in two matrices; and employs algorithms that implement certain set theory operations, including Cartesian product and set union to optimize the result for all items considered as a package.

BRIEF DESCRIPTION OF THE DRAWINGS

These and other features and advantages of the invention will now be described with reference to the drawings of certain preferred embodiments, which are intended to illustrate and not to limit the invention, and in which.

DETAILED DESCRIPTION OF THE INVENTION

In what follows, a preferred embodiment of the present invention will be described in detail with reference to the accompanying drawings.

To utilize the invention, a user seeking the best price or cost for a plurality of items (such as books) for sale on the Internet first uses his or her personal computer, modem (or other communications device) and Web browser software to connect to the Internet and log onto a Web site of the invention.

Initiation, User Input and Search Operations

Figure 1:
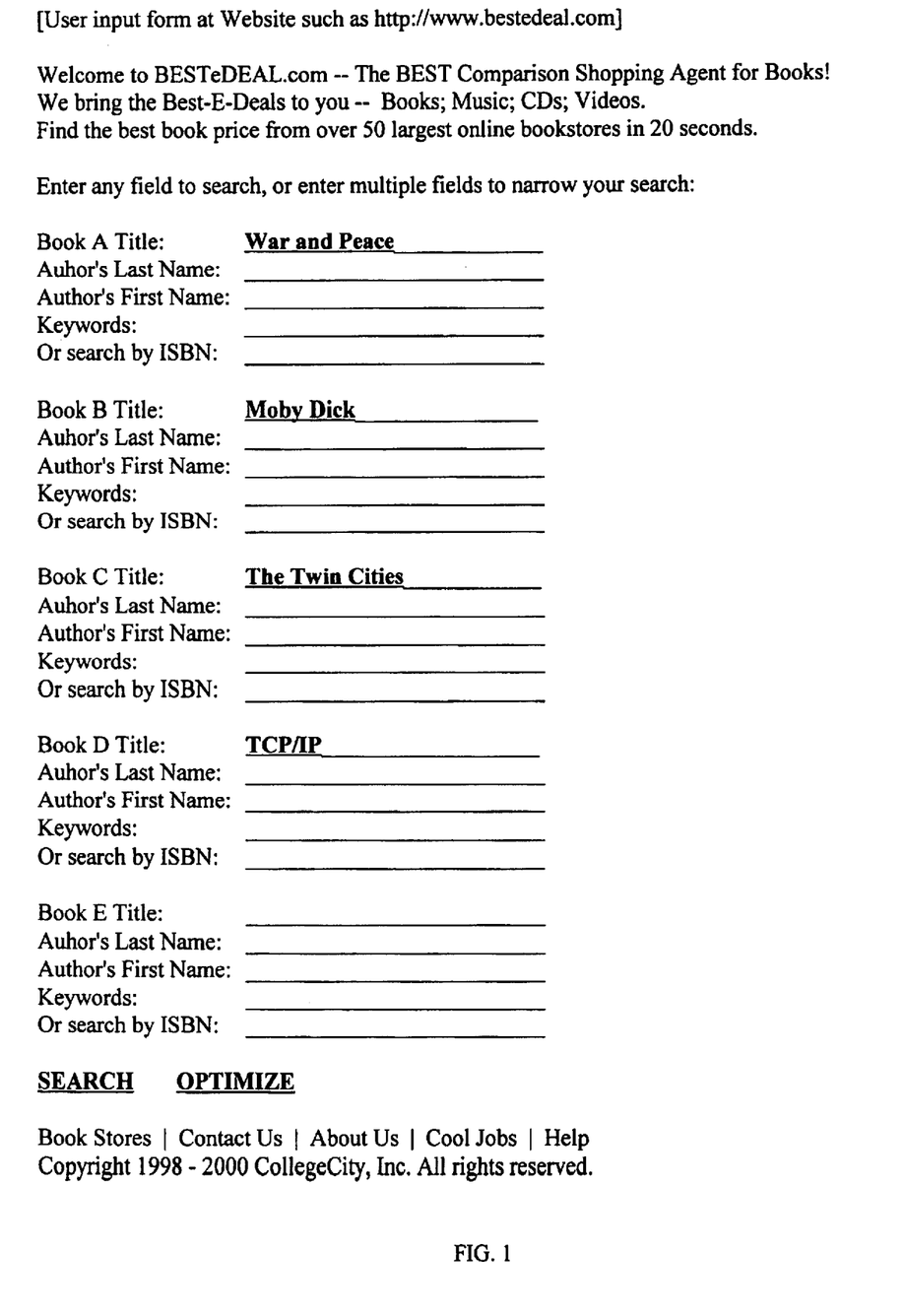
FIG. 1 is a pictorial outline of a sample user input form, where a user seeking a plurality of items (such as books) for sale on the Internet types in the desired titles or other information.

FIG. 1 illustrates an example of a user input form that is displayed to the user after the user has logged on. In this case, the form is designed for searching book titles. The invention, however, is not limited to the purchase of books. It also finds application in any situation where any group of items need to be optimized by a particular numeric variable. The variable could be purchase price, rental price, quantity, etc. The items could be books, music CDs, DVDs, magazines, videotapes, software disks, or virtually any other item that can be individually identified by name or title and arranged into a package. Thus, the invention finds application in a wide variety of business-to-consumer (B2C) and business-to-business (B2B) transactions on the Internet.

Next, the user types in the book titles (or other item descriptions) desired on the form. In the illustration, the user has entered four titles. Then, the user clicks on the "search" button to start the search, or the "optimize" button to optimize the prices for all books (i.e., calculate the lowest prices available for all books considered as a package). Next, in one embodiment, the invention looks up the ISBN number (International Standard Book Number) for each title from a database located either at the invention's Web site or at another site on the Internet. Then, a cgi (Common Gate Interface) script is executed to open a number of parallel "threads" or communication channels to all bookstores on the Internet (in this case, 56) that are believed to offer at least one of the titles for sale. Then, a search routine is executed at all bookstores simultaneously (or quickly serially) to search for each title by ISBN number. When each bookstore's search engine returns the price, availability and other information for each title, this information is communicated back to the Web site of the invention, and algorithms for the optimization, organization and display of the information are executed (discussed below).

Optimized Result Table

Figure 2:
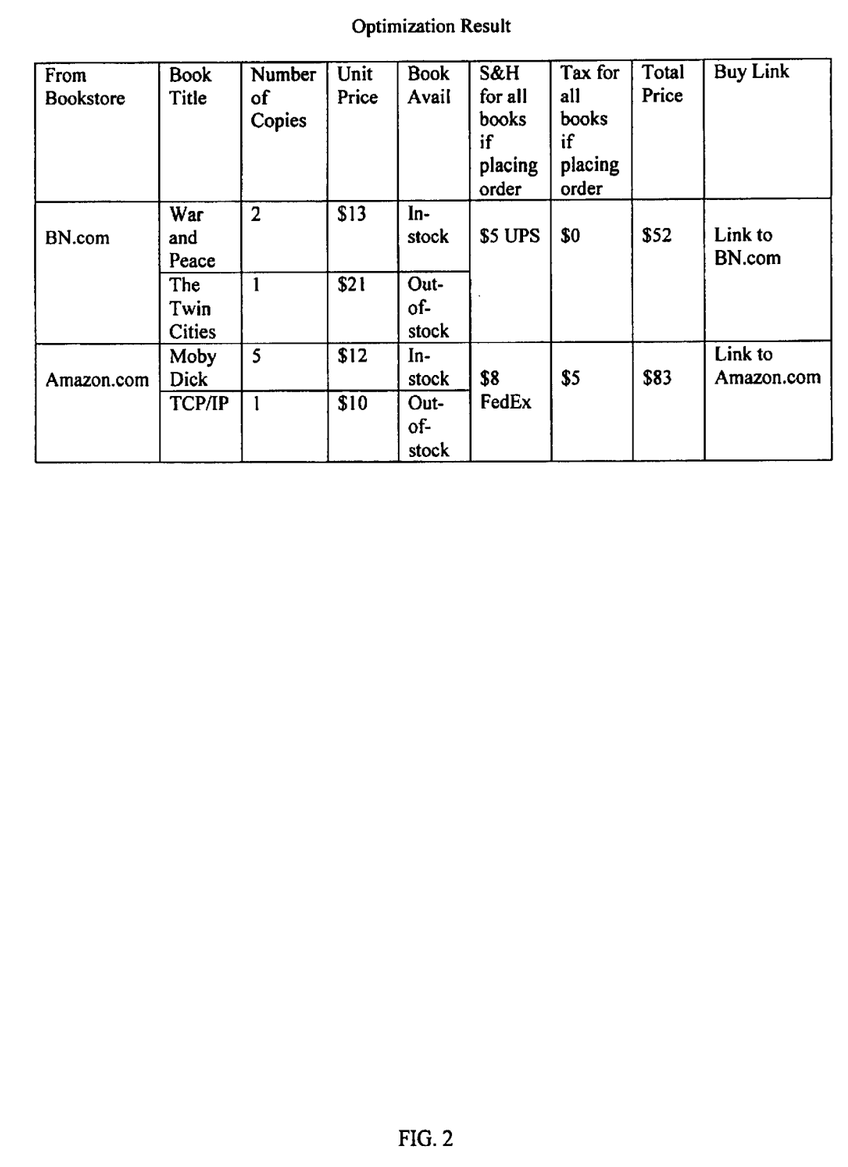
FIG. 2 is an example of a table of the optimized search results that are returned by the invention after the user's search from FIG. 1.

FIG. 2 is an example of a table of optimized search results that are returned by the invention after the user's search from FIG. 1. As can be seen, information about the books or other items is organized by bookstore, book title, number of copies requested, unit price posted at the best on-line stores which carry each particular title, availability information, shipping and handling charge, tax, total price, and hyperlink to the Web site of the bookstores where the lowest priced books may be purchased. Also shown is a grouping of titles into the lowest priced packages that are available from particular bookstores. In this example, after the approximation and optimization algorithms have been executed, the invention has determined that one bookstore, namely Barnes and Noble, offers the lowest price for the package consisting of the titles "War and Peace" and "The Twin Cities," whereas another bookstore, namely Amazon, offers the lowest price for the package consisting of the titles "Moby Dick" and "TCP/IP." (Two titles are shown temporarily out of stock, but this is not considered a problem because the titles may return to in-stock status in a short time.)

For other searches, it is possible that the lowest package price for all titles or other items could be available from a single bookstore, or a different bookstore may be identified for each of the titles separately in order to yield the lowest total price. A store or merchant (e.g., bookstore) index is also established with merchant identifiers.

Matrix Establishment and Pre-Computation

Figure 3:
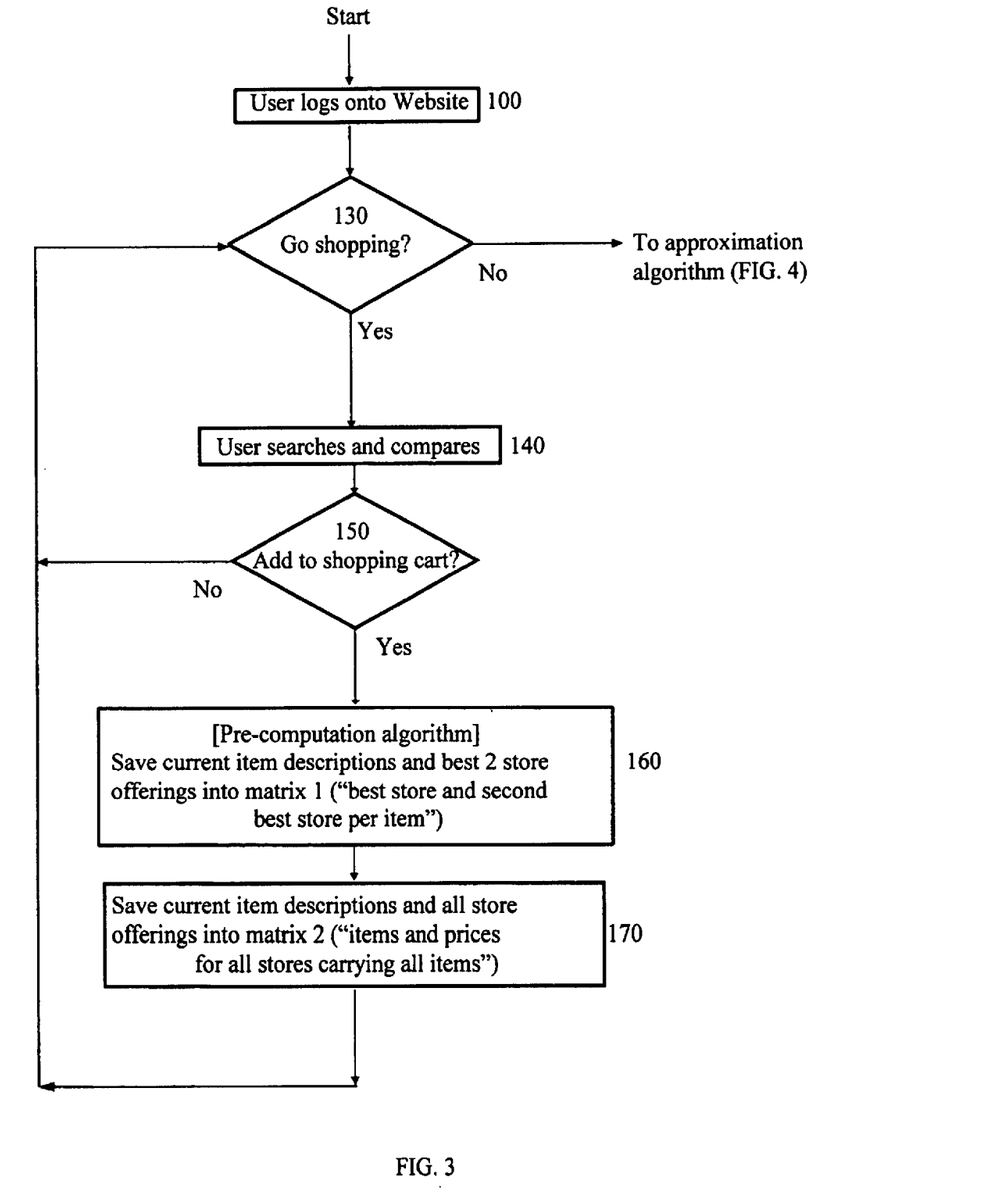
FIG. 3 is a flowchart showing the basic steps carried out at the beginning of one embodiment of the invention, including the pre-computation algorithm with matrices.

FIG. 3 is a flowchart showing some initial steps carried out in one embodiment of the invention, including pre-computation algorithms using matrices. To start, the user logs onto the Web site of the invention at step 100. At decision step 130, the user is asked if he or she wishes to "go shopping" for one or more books. If the answer is "yes, the user requests a search using the form of FIG. 1. Searching may be done by title, author's last name, first name, keyword or ISBN number. After the search results are returned and displayed, the user may compare price and other information from a list of all bookstores that carry the book. In decision step 150, the user is asked whether he or she wants to add the book to the "shopping cart" for an actual purchase. If "no," then the user is returned to step 130 in the event another search is desired.

As soon as the first book is added to the shopping cart, the method of the invention executes a "pre-computation" algorithm at steps 160 and 170 (FIG. 3). The algorithm starting at step 160 is as follows:

(1) Establish matrix 1.
(2) Save the current item descriptions (book titles, etc.) into matrix 1.
(3) Save the best store's offering (lowest price and identifier) into matrix 1.
(4) Save the second best store's offering into matrix 1.

Therefore, for N items (such as titles of books), an N×2 matrix is recorded. For two items (such as books), an example of matrix 1 would be:

$$\begin{bmatrix} S1a & S1b \\ S2a & S2b \end{bmatrix}$$

where
S1a=Store with best price for item 1
S1b=Store with $2^{nd}$ best price for item 1
S2a=Store with best price for item 2
S2b=Store with $2^{nd}$ best price for item 2.

The algorithm continues at step 170, where all merchant prices (not necessarily the best prices) for all items are recorded. The steps are:

(1) Establish matrix 2.
(2) Save the current item descriptions (book titles, etc.) into matrix 2.
(3) Save the prices offered by all stores that carry all items into matrix 2.

In a preferred embodiment, the present invention searches a total of 56 online bookstores on the Internet. Not all of these, however, will carry every title. For best results, the invention records an entry for only those bookstores that carry all titles requested by the user. As used herein, a bookstore is said to "carry" or "offer" a book if it is in the bookstore's official catalog, even if the book is temporarily out of stock. A purpose for recording all such prices in matrix 2 is to handle a situation where the lowest total price for all books considered as a package happens to be where all books are carried by one store. This is discussed in more detail below.

Therefore, for N items (such as titles of books), given M online stores that carry all N items, an N X M matrix is recorded. For two books and four stores, each of which carry both books, an example of matrix 2 would be:

$$\begin{bmatrix} \text{Item 1/Store 1} & \text{Item 1/Store 2} & \text{Item 1/Store 3} & \text{Item 1/Store 4} \\ \text{Item 2/Store 1} & \text{Item 2/Store 2} & \text{Item 2/Store 3} & \text{Item 2/Store 4} \end{bmatrix}$$

The pre-computation algorithm discussed above is repeated each time a user adds an item to the shopping cart, as shown by the sequence in FIG. 3 that cycles around the following path: step 170, decision 130, step 140, decision 150 and step 160. Each time the cycle is repeated to add another item, an additional row is added to matrix 1 and an additional row is added to matrix 2. Of course, if the user later changes his or her mind and decides to remove an item from the cart, then one row is deleted from each matrix respectively. Matrices 1 and 2 are each recorded in separate files.

Set Theory Background

The approximation and optimization algorithms of the present invention will now be discussed. For better understanding of these algorithms, it is useful to provide a brief background of set theory mathematics. A set is a collection of items called elements of the set. The elements are determined by one or more rules and are usually ordered. There are two types of notation for representing sets, namely roster notation and set-builder notation. Roster notation is a complete or implied listing of all the elements of the set. An example is: A={a, b, c, d}, which may also be called a "4-tuple." Set-builder notation is used when the roster method is cumbersome or impossible. An example is: {x|x is a real number}. Below is a list of some commonly used symbols:
X=Cartesian product
∪=set union
∈=element of
|=such that.

In set theory and matrix operations, the Cartesian product and union operators are well-known. The "Cartesian product" X is defined as a set that is constructed from two or more given sets and comprises all pairs or other "n-tuples" of elements such that one element of the tuple is from the first set, the next element is from the second set, and so on. In mathematical notation, for a group of n sets $A_1, A_2, \ldots A_n$, this can be expressed as: $A_1 X A_2 X \ldots A_n$, and the resulting set consists of all n-tuples $(m_1, \ldots m_n)$ with $m_i \in A_i$ for $i=1, 2, \ldots n$. The "set Union" ∪ is defined as a set that is constructed from two or more given sets and comprises all pairs or other n-tuples of elements such that each element is a number at least one of the other sets. In mathematical notation, for two sets, this can be expressed as: $\{x|x \in A \text{ or } x \in B\}$, namely the set of x such that x is an element of set A or x is an element of set B.

Approximation and Optimization Algorithms

Figure 4:
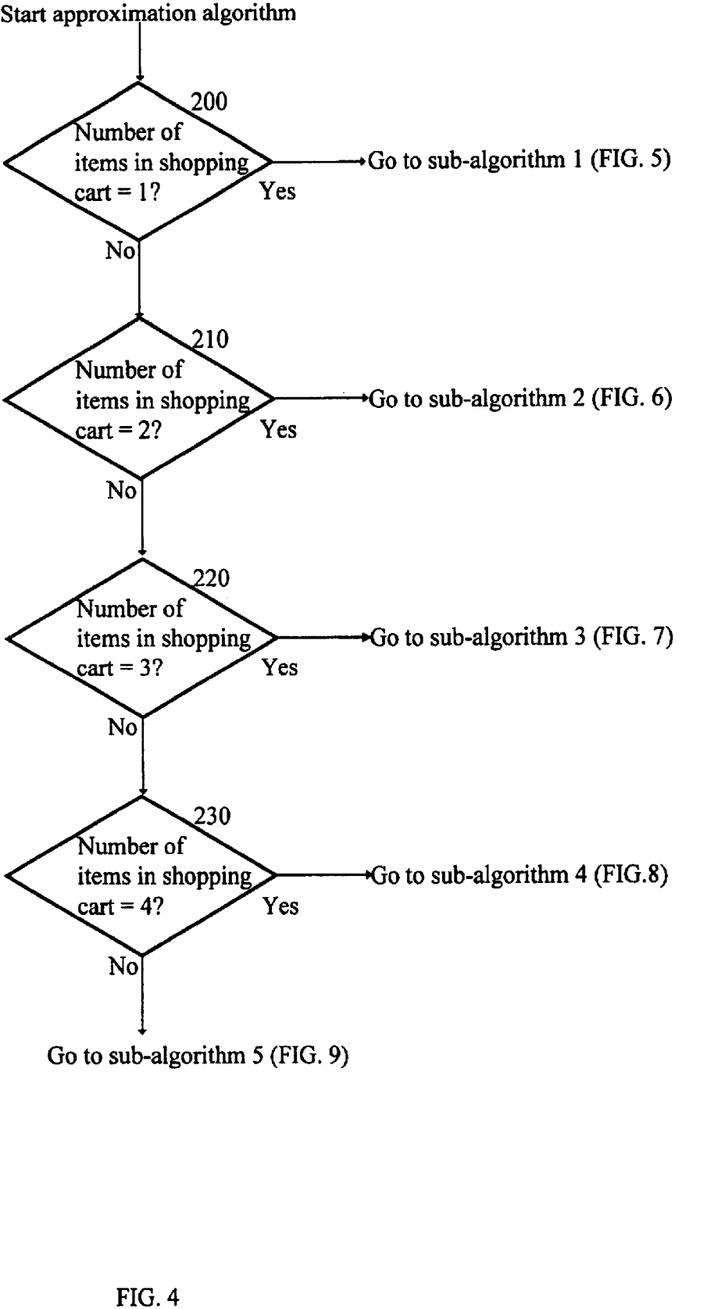
FIG. 4 is a flowchart illustrating the approximation algorithm of the invention.

Turning now to FIG. 4, this figure, together with FIGS. 5–9, illustrate the approximation and optimization algorithms of the present invention. In a preferred embodiment, five situations will be considered in turn, starting with one item selected by the user and then going up to five items. Each time one item is added, the complexity of the optimization calculations increases because, of course, the number of possible combinations increases with each additional item. In fact, the number of combinations doubles with each additional item added.

To manage the varying complexity that is presented in "real world" searching by users, each situation (from N=1 to N>=5, where N is the number of titles in the shopping cart) is handled by a different sub-algorithm of the invention.

In a preferred embodiment, after the user has finished shopping at decision step 130 (FIG. 3), the user clicks on the "optimize" button on the Web site of the invention (see FIG. 1). The invention then proceeds to FIG. 4 to start the approximation algorithm. A series of four decision steps 200, 210, 220 and 230 redirects the process flow to a different sub-algorithm depending upon the number of titles N in the shopping cart. If N=1, then the flow is directed to sub-algorithm 1 of FIG. 5. If N=2, then the flow is directed to sub-algorithm 2 of FIG. 6. If N=3, then the flow is directed to sub-algorithm 3 of FIG. 7. If N=4, then the flow is directed to sub-algorithm 4 of FIG. 8. Finally, if N>=5, then the flow is directed to sub-algorithm 5 of FIG. 9.

Sub-algorithm 1

Figure 5:
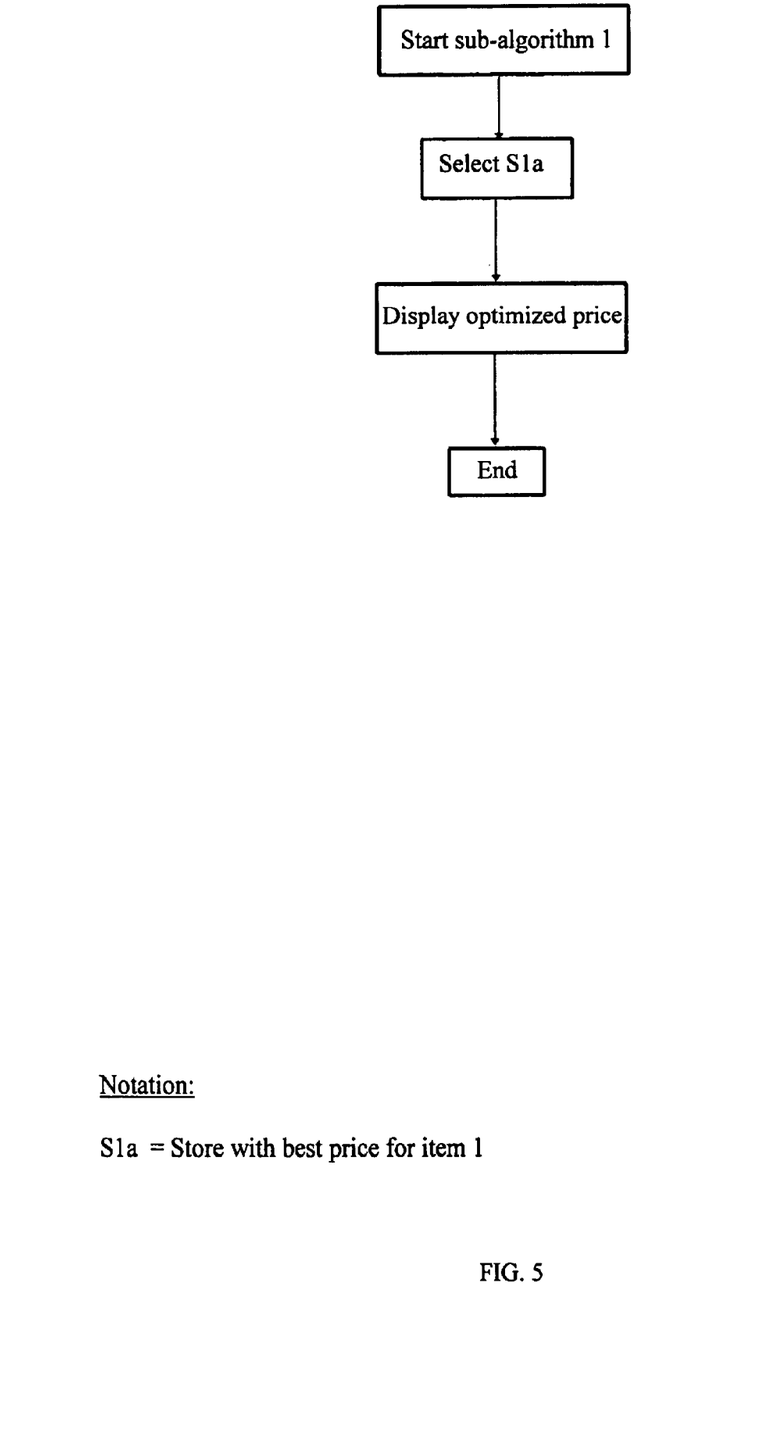
FIG. 5 is a flowchart illustrating sub-algorithm 1 of the invention.

Sub-algorithm 1 is illustrated in FIG. 5. Here, only one item has been selected by the user. Thus, only one possibility need be considered—select the store with the lowest price for that title. That store has already been located in the search (see FIG. 3). Thus, to achieve optimization, the invention chooses "S1a", meaning "store with the best price for title 1." This result is then displayed to the user at the invention's Web site. A simplified version of the table of FIG. 2 (having only one row) would be employed to display the result.

Sub-algorithm 2

Figure 6:
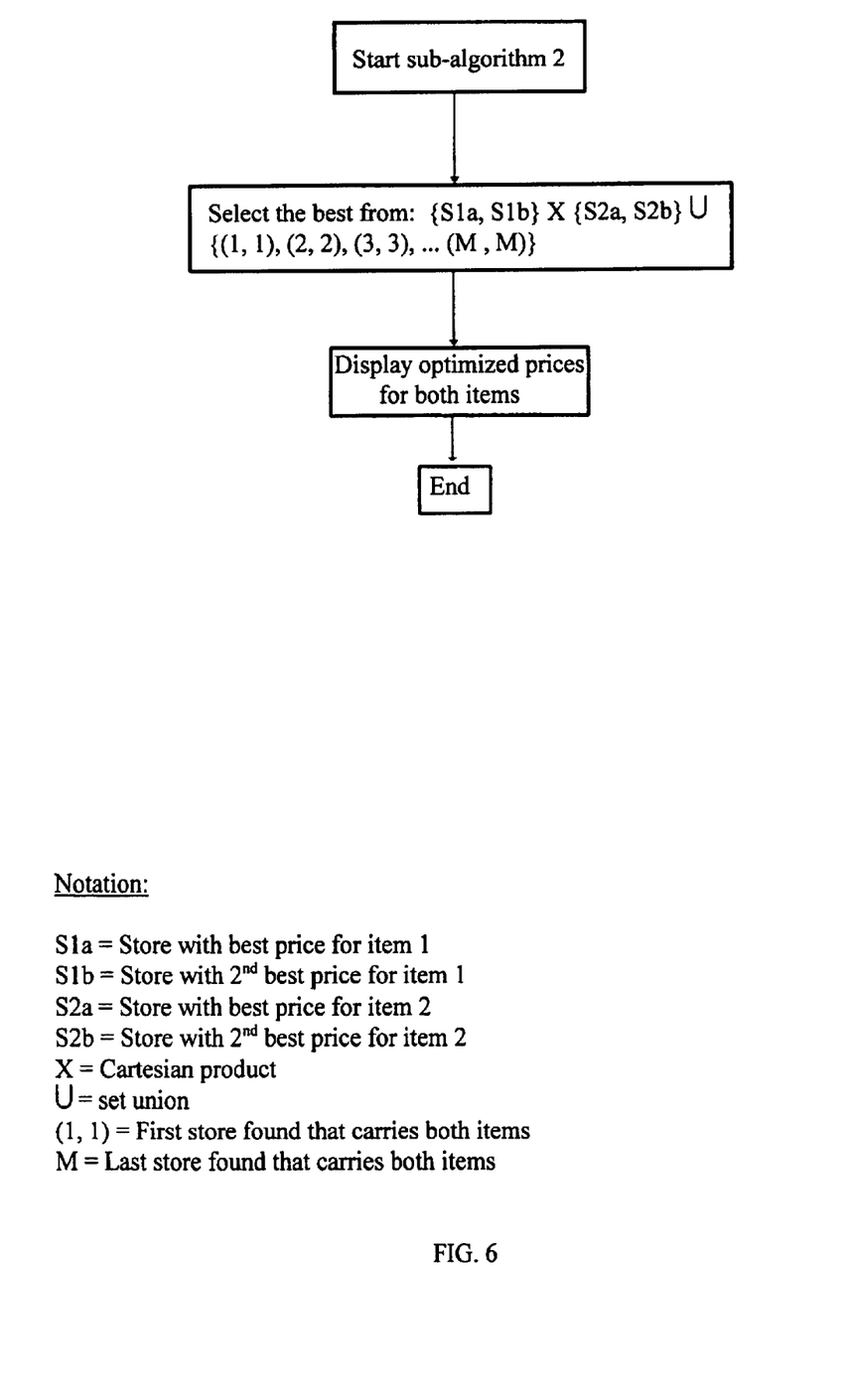
FIG. 6 is a flowchart illustrating sub-algorithm 2 of the invention.

Sub-algorithm 2 is illustrated in FIG. 6. Here, two items have been selected by the user. In a preferred embodiment, the combinations considered are those from matrices 1 and 2. Although more combinations could be considered, such as every price offered by every bookstore on the Internet for each item, this is not necessary. Near perfect optimization is achieved if only the best and second best individual stores for each item are considered, plus the best (lowest-price) store carrying both items. Thus, when N=2, the 2×2 combinations from matrix 1 plus the elements of matrix 2 are considered. The 2×2 combinations are:

$$\{(S1a, S2a), (S1a, S2b), (S1b, S2a), (S1b, S2b)\}$$

where
S1a=Store with best price for item 1
S1b=Store with $2^{nd}$ best price for item 1
S2a=Store with best price for item 2
S2b=Store with $2^{nd}$ best price for item 2.

Using this as a starting point, the approximation algorithm of the present invention for the optimization of 2 items is then calculated using the following formula:

$$\text{Select the best from: } \{S1a, S1b\} X \{S2a, S2b\} \cup \{(1, 1), (2, 2), (3, 3), \ldots (M, M)\}$$

where
X=Cartesian product
∪=set union
(1, 1)=First store found that carries both items
(2, 2)=Second store found that carries both items
(3, 3)=Third store found that carries both items
(M, M)=Last store found that carries both items.

Sub-algorithm 3

Figure 7:
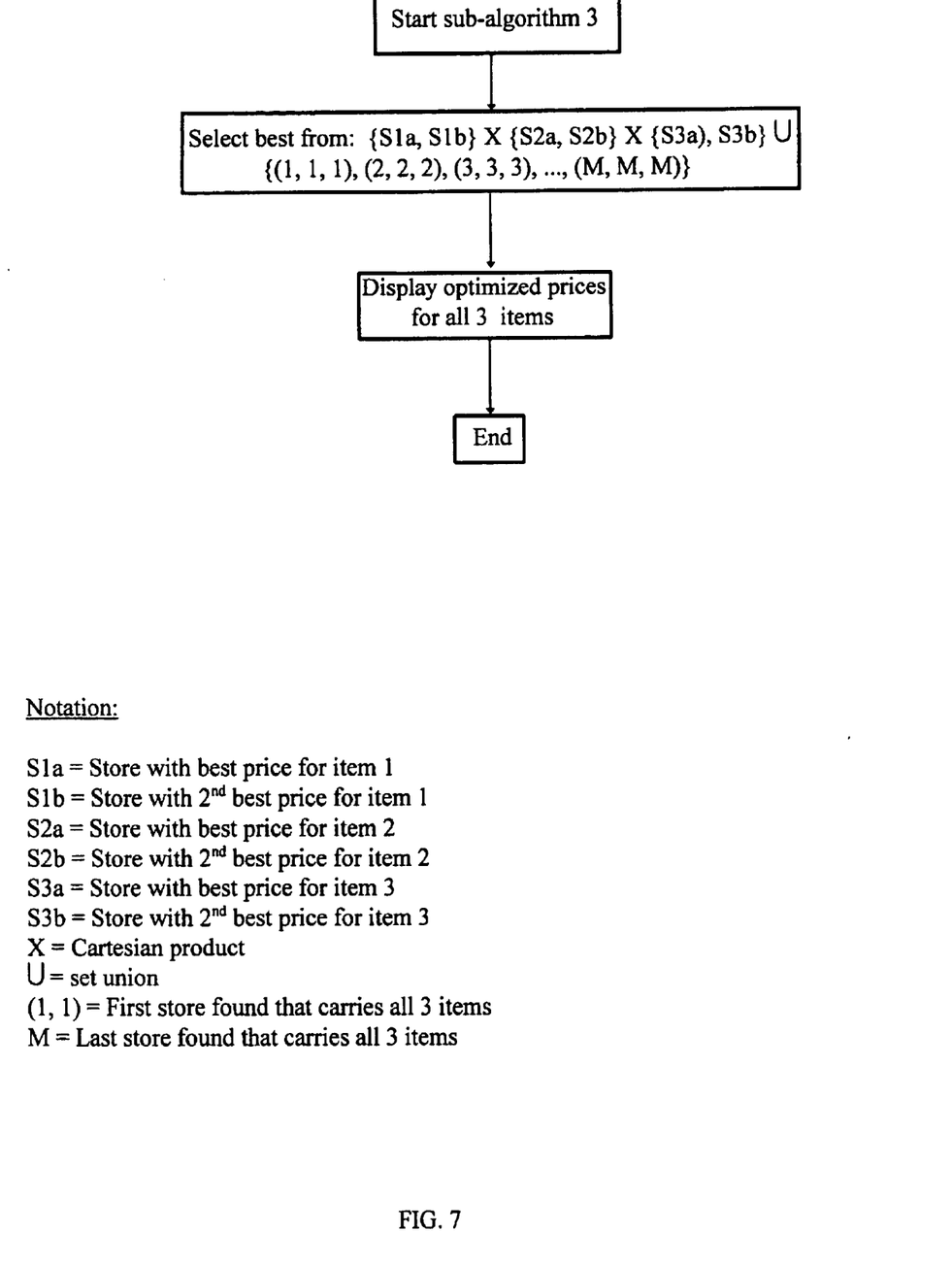
FIG. 7 is a flowchart illustrating sub-algorithm 3 of the invention.

Sub-algorithm 3 is illustrated in FIG. 7. Here, three items have been selected by the user. In a preferred embodiment, the combinations considered are those from matrices 1 and 2. As with the case with two items, although more combinations could be considered, such as every price offered by every bookstore on the Internet for all three books, this is not necessary. Near perfect optimization is achieved if only the best and second best individual stores for each item are considered, plus the best (lowest price) store carrying all three items. Thus, when N=3, the 2×2×2 combinations from matrix 1 plus the elements of matrix 2 are considered. The 2×2×2 combinations are:

$$\{(S1a, S2a), (S1a, S2b), (S1b, S2a), (S1b, S2b)\} X \{S3a, S3b\}$$

where
S1a=Store with best price for item 1
S1b=Store with $2^{nd}$ best price for item 1
S2a=Store with best price for item 2
S2b=Store with $2^{nd}$ best price for item 2
S3a=Store with best price for title 3
S3b=Store with $2^{nd}$ best price for item 3
X=Cartesian product.

Using this as a starting point, the approximation algorithm of the present invention for the optimization of 3 items is then calculated using the following formula:

$$\text{Select best from: } \{S1a, S1b\} X \{S2a, S2b\} X \{S3a), S3b\} \cup \{(1, 1, 1), (2, 2, 2), (3, 3, 3), \ldots, (M, M, M)\}$$

where
X=Cartesian product
∪=set union
(1, 1, 1)=First store found that carries all 3 items
(2, 2, 2)=Second store found that carries all 3 items, etc.
(M, M)=Last store found that carries all 3 items.

Sub-algorithm 4

Figure 8:
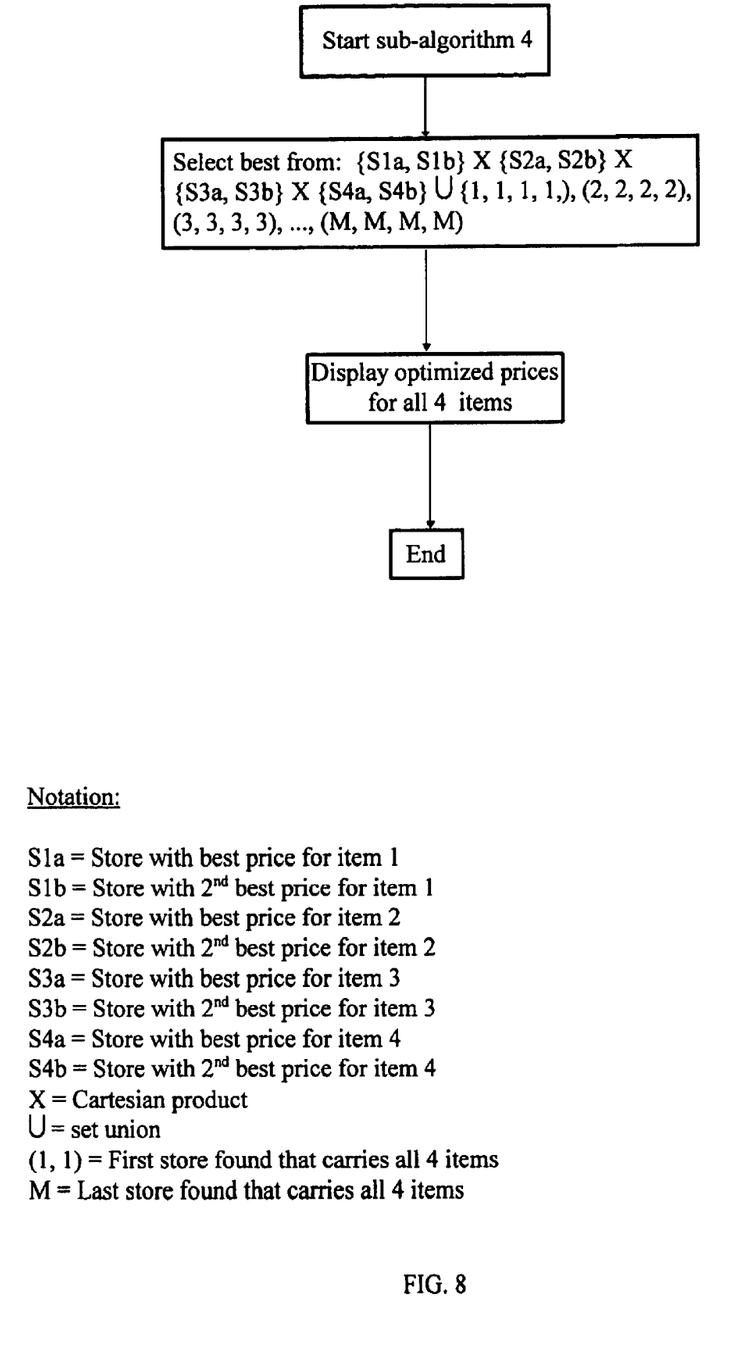
FIG. 8 is a flowchart illustrating sub-algorithm 4 of the invention.

Sub-algorithm 4 is illustrated in FIG. 8. Here, four items have been selected by the user. In the preferred embodiment, the combinations considered are those from matrices 1 and 2. As with the case with two and three items, although more combinations could be considered, such as every price offered by every bookstore on the Internet for all four books, this is not necessary. Near perfect optimization is achieved if only the best and second best individual stores for each item are considered, plus the best (lowest price) store carrying all four items. Thus, when N=4, the 2×2×2×2 combinations from matrix 1 plus the elements of matrix 2 are considered. The 2×2×2×2 combinations are:

{(S1a, S2a), (S1a, S2b), (S1b, S2a), (S1b, S2b)} X {S3a, S3b} X {S4a, S4b} where
S1a Store with best price for item 1
S2=Store with 2 best price for item 1
S2a=Store with best price for item 2
S2b=Store with $2^{nd}$ best price for item 2
S3a=Store with best price for title 3
S3b=Store with $2^{nd}$ best price for item 3
S4a=Store with best price for title 4
S4b=Store with $2^{nd}$ best price for title 4
X=Cartesian product.

Using this as a starting point, the approximation algorithm of the present invention for the optimization of 4 items is then calculated using the following formula:

Select best from: {S1a, S1b} X {S2a, S2b} X {S3a, S3b} X {S4a, S4b} ∪ {1, 1, 1, 1,), (2, 2, 2, 2), (3, 3, 3, 3), . . . , (M, M, M, M)

where
X=Cartesian product
∪=set union
(1, 1, 1, 1)=First store found that carries all 4 items
(2, 2, 2, 2)=Second store found that carries all 4 items, etc.
(M, M, M, M)=Last store found that carries all 4 items.
Sub-algorithm 5

Figure 9:
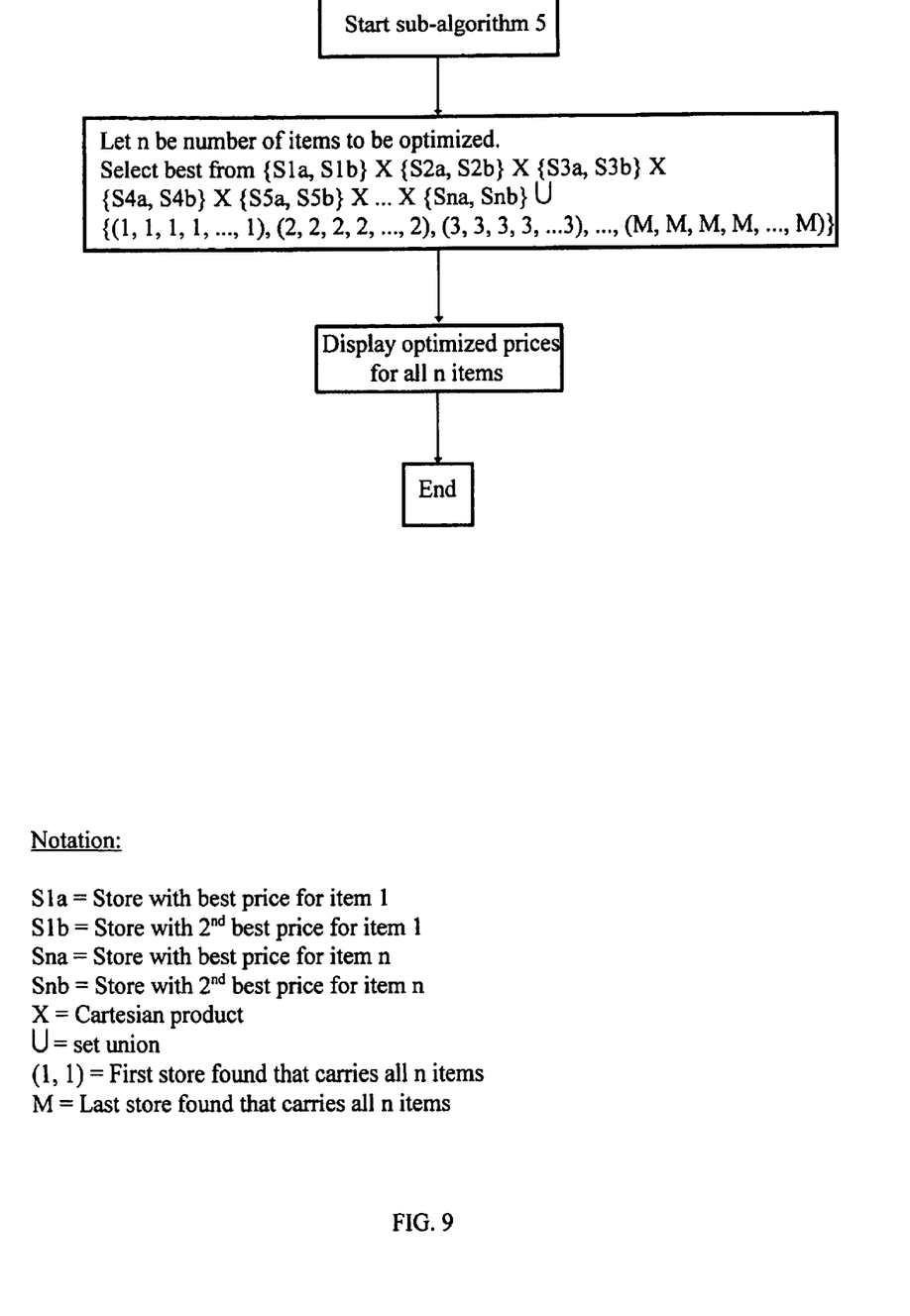
FIG. 9 is a flowchart illustrating sub-algorithm 5 of the invention.

Sub-algorithm 5 is illustrated in FIG. 9. This is the most generalized case, where five or more items ("n" items) have been selected by the user. In the preferred embodiment, the combinations considered are those from matrices 1 and 2. As with the case with sub-algorithms 2–4, although more combinations could be considered, such as every price offered by every bookstore on the Internet for all n books, this is not necessary. Near perfect optimization is achieved if only the best and second best individual stores for each item are considered, plus the best (lowest price) store carrying all n items. Thus, when n=4, the 2×2×2×2 combinations from matrix 1 plus the elements of matrix 2 are considered. For large numbers of n, it is only necessary to consider 2×2×2×2 combinations for the first 4 items. The combinations for n>=5 are:

{(S1a, S2a), (S1a, S2b), (S1b, S2a), (S1b, S2b)} X {S3a, S3b} X {S4a, S4b} X {S5a, S5b} X {S6a, S6b} X . . . X {Sna, Snb} where
S1a=Store with best price for item 1
S1b=Store with $2^{nd}$ best price for item 1
S2a=Store with best price for item 2
S2b=Store with $2^{nd}$ best price for item 2, etc.
Sna=Store with best price for item n
Snb=Store with $2^{nd}$ best price for title n
X=Cartesian product.

Using this as a starting point, the approximation algorithm of the present invention for the optimization of n items is then calculated using the following formula:
Let n be number of items in shopping cart.

Select best from {S1a, S1b} X {S2a, S2b} X {S3a, S3b} X {S4a, S4b} X {S5a, S5b} X . . . X {Sna, Snb} ∪ {(1, 1, 1, 1, . . . , 1), (2, 2, 2, 2, . . . , 2), (3, 3, 3, 3, . . . 3), . . . , (M, M, M, M, . . . , M)} where
X=Cartesian product
∪=set union
(1, 1, 1, 1, . . . , 1)=First store found that carries all n items
(2, 2, 2, 2, . . . , 2)=Second store found that carries all n items, etc.
(M, M, M, M, . . . , M)=Last store found that carries all n items.

CONCLUSION

The present invention provides a new software method and business method for searching for, optimizing and organizing information (such as price or cost data) for a plurality of items via the Internet.

Some advantages of the present invention include:

1. User utility through pre-computation. The best two stores and prices for any book title or other item are recorded in a matrix file. Another matrix file is recorded for the prices of all stores that carry all items.

2. Direct file access to obtain the price, cost or other data. The principle of "pre-computation" is hundreds of times faster than digging out the data individually or manually from the separate Web sites or stores or merchants. All data is quickly optimized upon a user pressing the "optimize" button on the Web site of the invention.

2. Low complexity of the algorithms used. The number of combinations is bounded by 2×2×2×2=16. For example, In addition to the cheapest bookstore among all bookstores and other sites searched, the invention provides a list of all titles of books or other items.

3. Close to optimal results. It is rarely likely that, in an optimal solution, a book or other item is chosen from an online store except from the best (lowest price) two stores corresponding to that item. Also, it is rarely likely that the user will want to purchase more than four items at once.

While the invention has been described herein with reference to certain preferred embodiments, these embodiments have been presented by way of example only, and not to limit the scope of the invention.

What is claimed is:

1. A method of searching for, calculating and displaying an approximately optimized rank of prices of a plurality of designated items in a package on the Internet, the method comprising the steps of:

establishing an Internet Web site, the site operating as a computer interface for a user who wishes to search for and approximately optimize prices of at least two designated items a package of the items;

receiving a search request for the plurality of items from the user uses communications equipment and software to access the Web site to obtain prices about the plurality of items;

executing a multiple, simultaneous computer search on the Internet for prices of the items offered at a plurality of Internet stores for all of the items designated in the search request;

establishing a first matrix in a pre-computation algorithm, and receiving and storing in the first matrix data representing the lowest and second lowest prices retrieved in the search for each of the items from the stores;

establishing a second matrix, and receiving and storing in the second matrix data representing each store that carries all items for sale:

calculating, using algorithms including Cartesian product and set union operations performed on the data stored in the first and second matrices, an approximately optimized rank of all of the items considered as a package; and displaying the approximately optimized rank to the user in table format.

2. The method of claim 1 in which the prices are prices posted at Internet stores that offer the items for sale.

3. The method of claim 1 in which the rank is a list of stores that offer the items for sale, arranged in ascending order of price per item or group of items.

4. The method of claim 3 in which each store in the list is displayed to the user together with a hyperlink to the store that offers each item or group for sale at the lowest price for that item or group.

5. The method of claim 3 in which the rank is calculated by performing algorithms including Cartesian product and set union operations on the data stored in the first and second matrices, the first matrix comprising a matrix of elements, each element representing the lowest and second lowest prices at which the stores are offering an item for sale, and the second matrix comprising a matrix of elements, representing a store that carries all items for sale.

6. The method of claim 5 in which the rank is calculated using the following set operations on the first and second matrices: select lowest price from $\{S1a, S1b\}$ X $\{S2a, S2b\}$ X $\{S3a, S3b\}$ X $\{S4a, S4b\}$ X $\{S5a, S5b\}$ X ... X $\{Sna, Snb\}$ $\cup \{(1, 1, 1, 1, \ldots, 1), (2, 2, 2, 2, \ldots, 2), (3, 3, 3, 3, \ldots 3), \ldots ; (M, M, M M, \ldots M)\}$, where n=number of items; Sna=store with best price for item n; Snb=store with second price for item n; X=Cartesian product; $\cup$=set union; (1, 1, 1, 1, ..., 1)=first store found that carries all n items; (2, 2, 2, 2, ..., 2)=second store found that carries all n items, etc.; and (M, M, M, M, ..., M)=last store found that carries all n items.

7. The method of claim 1 in which the items are consumer items.

8. The method of claim 7 which in the consumer items consist of one or more of the following types: books, magazines, music CDs, DVDs, software and videotapes.

9. The method of claim 8, in which the items are books, and the books may be searched by title, author's name, keyword or ISBN number.

10. The method of claim 1, in which the steps of executing the search, establishing the first and second matrices, calculating the rank and displaying the rank are performed during a single Web session.

11. The method of claim 1, in which the displayed table format includes a grouping of the items by store.

12. The method of claim 1, in which the prices are either purchase prices or rental prices.

13. A method of executing commands in a computer to perform searching, calculating, comparing, approximately optimizing, ranking and displaying operations for multiple items in a package desired to be purchased over the Internet, the method comprising the steps of:

establishing an Internet Web site, the site operating as a computer interface for a user who wishes to search for and approximately optimize prices of at least two designated items in a package of the items;

receiving a search request for the plurality of items from the user who uses communications equipment and software to access the Web site to obtain prices about the plurality of items;

executing a multiple, simultaneous computer search on the Internet for prices of the items offered at a plurality of Internet stores for all of the items designated in the search request;

establishing a first matrix in a pre-computation algorithm, and receiving and storing in the first matrix data representing the lowest and second lowest prices retrieved in the search for each of the items from the stores;

establishing a second matrix, and receiving and storing in the second matrix data representing each store that carries all items for sale;

calculating, using algorithms including Cartesian product and set union operations performed on the data stored in the first and second matrices, an approximately optimized rank of all of the items considered as a package; and displaying the approximately optimized ranks to the user in table format.

14. The method of claim 13 in which the prices are prices posted at Internet stores that offer the items for sale.

15. The method of claim 13 in which the rank is a list of stores that offer the items for sale, arranged in ascending order of price per item or group of items.

16. The method of claim 15 in which each store in the list is displayed to the user together with a hyperlink to the store that offers each item or group for sale at the lowest price for that item or group.

17. The method of claim 15 in which the rank is calculated by performing algorithms including Cartesian product and set union operations on the data stored in the first and second matrices, the first matrix comprising a matrix of elements, each element representing the lowest and second lowest prices at which the stores are offering an item for sale, and the second matrix comprising a matrix of elements, each element representing a store that carries all items for sale.

18. The method of claim 17 in which the rank is calculated using the following set operations on the first and second matrices: select lowest price from $\{S1a, S1b\}$ X $\{S2a, S2b\}$ X $\{S3a, S3b\}$ X $\{S4a, S4b\}$ X $\{S5a, S5b\}$ X ... X $\{Sna, Snb\}$ $\cup \{(1, 1, 1, 1, \ldots 1), (2, 2, 2, 2, \ldots, 2), (3, 3, 3, 3, \ldots 3), \ldots, (M, M, M, M, \ldots, M)\}$, where n number of items; Sna=store with best price for item n; Snb store with second best price for item n; X=Cartesian product; $\cup$=set union; (1, 1, 1, ..., 1), first store found that carries all n items; (2, 2, 2, 2, ..., 2)=second store found that carries all n items, etc.; and (M, M, M, M, ..., M)=last store found that carries all n items.

19. The method of claim 13 in which the items are consumer items.

20. The method of claim 19 in which the consumer items consist of one or more of the following types: books, magazines, music CDs, DVDs, software and videotapes.

21. An article of manufacture comprising a computer readable medium containing executable instructions which, when executed in a computer, cause the computer to perform method steps for executing commands to perform operations comprising the steps of:

operating an Internet Web site, the site operating as computer interface for a user who wishes to search for and approximately optimize prices of at least two designated items in a package of the items;

receiving a search request for the plurality of the items from the user who uses communications equipment and software to access the Web site to obtain prices about the plurality of items;

executing a multiple, simultaneous computer search on the Interne for prices of the items offered at a plurality of Internet stores for all of the items designated in the search request;

establishing a first matrix in a pre-computation algorithm, and receiving and storing in the first matrix data representing the lowest and second lowest prices retrieved in the search for each of the items from the stores;

establishing a second matrix, and receiving and storing in the second matrix data representing each store that carries all items for sale;

calculating, using algorithms including Cartesian product and set union operations performed on the data stored in the first and second matrices, an approximately optimized rank of all of the items considered as a package; and displaying the approximately optimized rank to the user in table format.

22. The method of claim 21 in which the prices are prices posted at Internet stores that offer the items for sale.

23. The method of claim 21 in which the rank is a list of stores that offer the items for sale, arranged in ascending order of price per item or group of items.

24. The method of claim 23 in which each store in the list is displayed to the user together with a hyperlink to the store that offers each item or group for sale at the lowest price for that item or group.

25. The method of claim 23 in which the rank is calculated by performing algorithms including Cartesian product and set union operations on the data stored in the first and second matrices, the first matrix comprising a matrix of elements, each element representing the lowest and second lowest prices at which the stores are offering an item for sale, and the second matrix comprising a matrix of elements, each element representing a store that carries all items for sale.

26. The method of claim 25 in which the rank is calculated using the following set operations on the first and second matrices: select lowest price from {S1a, S1b} X {S2a, S2b} X {S3a, S3b} X {S4a, S4b} X {S5a, S5b} X . . . X {Sna, Snb} ∪ {(1, 1, 1, 1, . . . 1), (2, 2, 2, 2, . . . , 2), (3, 3, 3, 3, . . . 3), (M, M, M, M, . . . , M)}, where n=number of items; Sna=store with best price for item n; Snb=store with second best price for item n; X=Cartesian product; ∪=set union; (1, 1, 1, 1, . . . , 1)=first store found that carries all n items; (2, 2, 2, 2, . . . , 2)=second store found that carries all n items, etc.; and (M, M, M, M . . . , M)=last store found that carries all n items.

27. The method of claim 21 in which the items are consumer items.

28. The method of claim 27 in which the consumer items consist of one or more of the following types: books, magazines, music CDs, DVDs, software and videotapes.

* * * * *